United States Patent
Weinblatt

(10) Patent No.: US 9,219,558 B2
(45) Date of Patent: Dec. 22, 2015

(54) MONITORING TV VIEWING WITH PROGRAMS FROM CABLE/SATELLITE PROVIDERS

(75) Inventor: Lee S. Weinblatt, Teaneck, NJ (US)

(73) Assignee: Winmore, Inc., Tenafly, NJ (US)

( * ) Notice: Subject to any disclaimer, the term of this patent is extended or adjusted under 35 U.S.C. 154(b) by 351 days.

(21) Appl. No.: 12/419,922

(22) Filed: Apr. 7, 2009

(65) Prior Publication Data

US 2009/0260027 A1    Oct. 15, 2009

Related U.S. Application Data

(60) Provisional application No. 61/123,316, filed on Apr. 7, 2008.

(51) Int. Cl.
| | |
|---|---|
| H04N 21/439 | (2011.01) |
| H04N 21/442 | (2011.01) |
| H04H 60/37 | (2008.01) |
| H04N 21/41 | (2011.01) |
| H04H 60/45 | (2008.01) |
| H04H 60/46 | (2008.01) |
| H04H 60/48 | (2008.01) |

(52) U.S. Cl.
CPC ............ *H04H 60/37* (2013.01); *H04H 60/45* (2013.01); *H04H 60/46* (2013.01); *H04H 60/48* (2013.01); *H04N 21/4126* (2013.01); *H04N 21/4394* (2013.01); *H04N 21/44213* (2013.01)

(58) Field of Classification Search
CPC ............ H04N 21/4126; H04N 21/42203; H04N 21/6582; H04N 21/44218; H04N 21/44222; H04N 21/439; H04N 21/44213; H04N 21/4394; H04N 21/233; H04H 60/58
See application file for complete search history.

(56) References Cited

U.S. PATENT DOCUMENTS

| | | | | |
|---|---|---|---|---|
| 4,718,106 | A | | 1/1988 | Weinblatt |
| 4,972,503 | A | * | 11/1990 | Zurlinden ................. 725/14 |
| 5,457,807 | A | | 10/1995 | Weinblatt |
| 5,532,732 | A | * | 7/1996 | Yuen et al. ................ 725/20 |
| 5,550,928 | A | * | 8/1996 | Lu et al. .................. 382/116 |
| 5,630,203 | A | | 5/1997 | Weinblatt |
| 5,832,514 | A | * | 11/1998 | Norin et al. ................... 1/1 |
| 5,872,588 | A | * | 2/1999 | Aras et al. ................ 725/14 |
| 7,155,159 | B1 | * | 12/2006 | Weinblatt et al. ......... 455/2.01 |
| 7,471,987 | B2 | * | 12/2008 | Crystal et al. ............. 700/94 |
| 7,483,975 | B2 | * | 1/2009 | Kolessar et al. .......... 709/224 |
| 7,840,976 | B1 | * | 11/2010 | Harvey et al. ............. 725/27 |
| 2001/0056579 | A1 | * | 12/2001 | Kogane et al. ........... 725/105 |
| 2002/0112238 | A1 | * | 8/2002 | Kanojia et al. ............ 725/42 |

(Continued)

FOREIGN PATENT DOCUMENTS

| | | |
|---|---|---|
| EP | 1 133 090 | 9/2001 |
| WO | WO 99/33206 | 7/1999 |

*Primary Examiner* — Pinkal R Chokshi
(74) *Attorney, Agent, or Firm* — Cozen O'Connor

(57) ABSTRACT

A technique is disclosed for monitoring viewership of programs being performed on reproduction equipment in response to a received broadcast signal. The technique comprises receiving the broadcast signal to provide a received output signal, adding a selected monitoring code to the received output signal to provide a combined output signal, inputting the received output signal to reproduction equipment for performing programs in the broadcast signal and for transmitting the monitoring code, detecting the transmitted monitoring code with a code detector positioned in proximity to the reproduction equipment; and providing viewership information based on the monitoring code.

18 Claims, 1 Drawing Sheet

(56) References Cited

U.S. PATENT DOCUMENTS

| | | |
|---|---|---|
| 2003/0022622 A1 | 1/2003 | Weinblatt et al. |
| 2004/0019463 A1 | 1/2004 | Kolessar et al. |
| 2006/0075421 A1* | 4/2006 | Roberts et al. .................... 725/9 |
| 2006/0251390 A1* | 11/2006 | Lim et al. ........................ 386/95 |
| 2007/0061830 A1* | 3/2007 | Chang ............................... 725/9 |
| 2008/0022336 A1* | 1/2008 | Howcroft et al. .............. 725/100 |
| 2009/0158309 A1* | 6/2009 | Moon et al. ...................... 725/12 |
| 2009/0307201 A1* | 12/2009 | Dunning et al. .................. 707/4 |
| 2009/0313232 A1* | 12/2009 | Tinsley et al. .................... 707/5 |
| 2010/0064320 A1* | 3/2010 | Angiolillo et al. .............. 725/46 |
| 2013/0254790 A1* | 9/2013 | Meier et al. ...................... 725/14 |

* cited by examiner

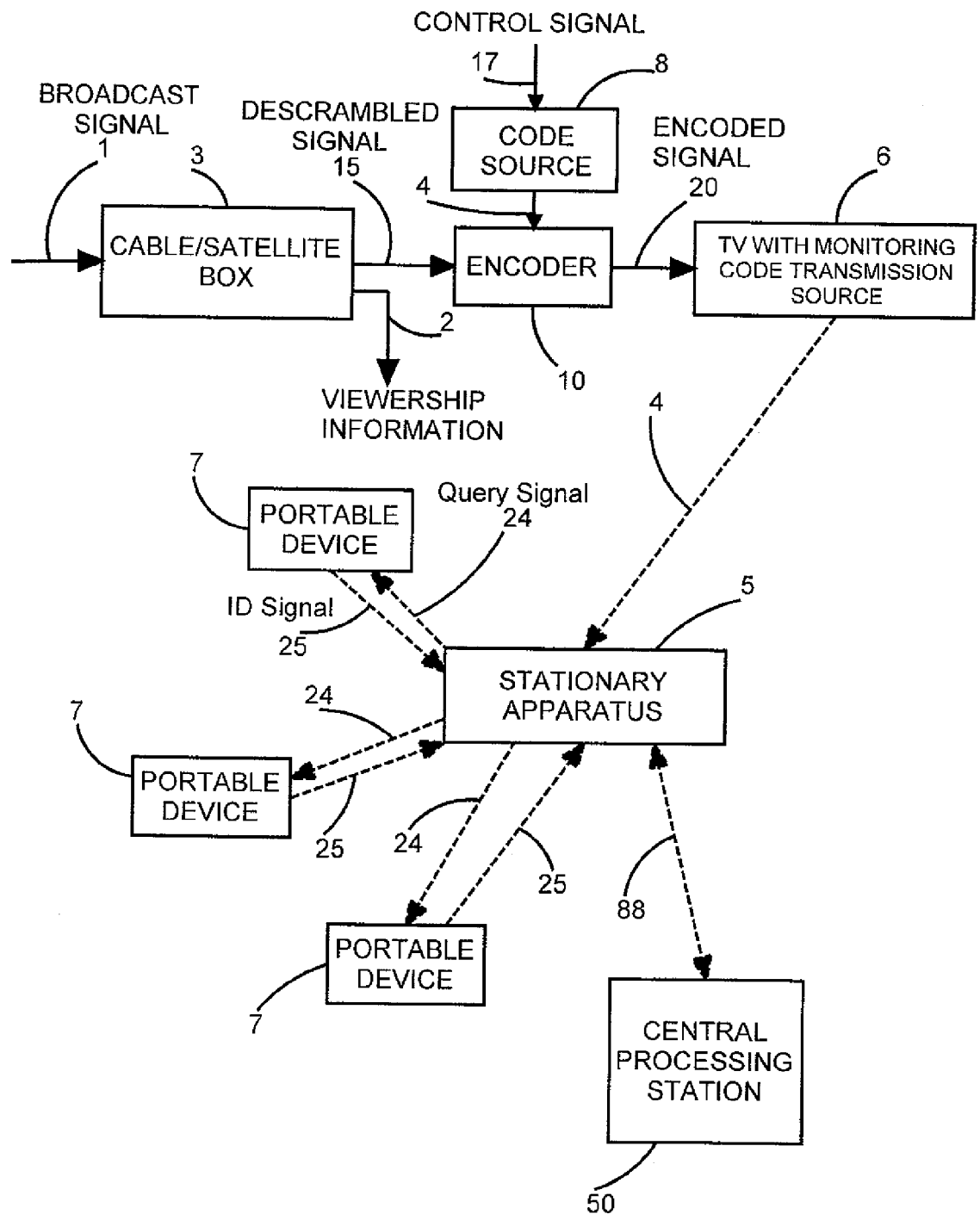

MONITORING TV VIEWING WITH PROGRAMS FROM CABLE/SATELLITE PROVIDERS

RELATED APPLICATIONS

This application claims priority from U.S. Provisional Patent Application Ser. No. 61/123,316 which was filed on Apr. 7, 2008, the entire content of which is hereby incorporated by reference.

FIELD OF THE INVENTION

The present invention is directed to a technique for improving the accuracy with which viewership of cable television ("TV") and satellite TV is determined.

BACKGROUND OF THE INVENTION

This invention is intended to address the following problem. The cable TV box and satellite TV box jointly referred to herein for convenience and simplicity by the term "receiver box", or just "box") in use today performs its well known function of descrambling the signal provided from the satellite company or the cable company so that programs can be displayed on reproduction equipment, such as TV. Of course, the word "program" as used herein refers to shows and/or commercials, typically with video and audio, that are transmitted to a wide audience by cable and satellite companies. In some such systems, the box can also serve to send a signal back to the cable or satellite provider that contains audience monitoring, or viewership, information on what program is being viewed and when. The viewership information can be sent to the cable provider via the same cable, and to the satellite provider via telephone or Internet communications.

Although such viewership information is useful, obtaining it from the box has a shortcoming because it is not possible to know whether at the same time that the box is sending viewership information the TV is still ON. In other words, since the box and the TV operate independently of each other, it is possible for the TV to be OFF while the box is ON. When this happens, the box keeps feeding viewership information signals back to the provider as if the TV were still being watched. Of course, information obtained under these conditions will skew the results to show a higher viewership than that which actually occurred. Thus, it is important to know not only the information provided by the box but also whether or not the TV is simultaneously ON while the box was providing the viewership information signals.

If all that were required was to know whether or not the TV is ON while the box is ON, this could be determined by some ON/OFF sensor. However, TVs are currently used for various tasks other than watching programs fed by the cable/satellite providers. For example, a videogame can be played on the TV, or the TV screen can be used as the output of a PC. This, as well as several other uses, require the TV to be ON, but it is not displaying a TV program. Consequently, it is necessary to know not only that the TV is ON but also that it is displaying a program fed to it by the cable/satellite providers.

SUMMARY OF THE INVENTION

One object of the invention is to improve the accuracy with which viewership of cable TV and satellite TV is determined.

This and other objects are attained in accordance with one aspect of the present invention directed to an apparatus for monitoring viewership of programs being performed on reproduction equipment in response to a received broadcast signal. The apparatus include means for receiving the broadcast signal to provide a received output signal. An encoding means adds a selected monitoring code to the received output signal to provide a combined output signal. The received output signal is inputted to reproduction equipment provided for performing programs in the broadcast signal and for transmitting the monitoring code. Means positioned in proximity to the reproduction equipment detects the transmitted monitoring code, and processing means provides viewership information based on the monitoring code.

Another aspect of the present invention is directed to a method for monitoring viewership of programs being performed on reproduction equipment in response to a received broadcast signal. The method comprises the steps of receiving the broadcast signal to provide a received output signal, adding a selected monitoring code to the received output signal to provide a combined output signal, inputting the received output signal to reproduction equipment for performing programs in the broadcast signal and for transmitting the monitoring code, detecting the transmitted monitoring code with a code detector positioned in proximity to the reproduction equipment; and providing viewership information based on the monitoring code.

BRIEF DESCRIPTION OF THE DRAWING

The drawing depicts a schematic block diagram of an arrangement in accordance with an embodiment of the invention.

DETAILED DESCRIPTION OF THE DRAWING

Automated audience surveying techniques are known in which the test participants forming the audience need only play a passive role. For example, it is known to utilize a survey signal transmitted by a broadcast station in combination with a programming signal. As disclosed in U.S. Pat. No. 4,718, 106 issued to the present inventor, the transmitted survey signal is detected by a receiver and reproduced by a speaker. The speaker produces pressure waves in the air that can be detected by a microphone, for example, and with a frequency that is in what is scientifically regarded as the audible range of human hearing. Such pressure waves, or signals, are referred to as acoustic. An acoustic signal is regarded as being audible, irrespective of whether it is actually heard by a person, as long as it can be produced by a conventional speaker and detected by a conventional microphone. The audible acoustic signal is detected by a microphone and associated circuitry embodied in a portable device worn by the test participants, and data on the incidence of occurrence and/or the time of occurrence of the acoustic signal, and the code it contains, are stored and analyzed therein. Variations of this passive technique can be found in U.S. Pat. Nos. 5,457,807 and 5,630,203 both issued to the present inventor. The subject matter of both of these patents is hereby incorporated by reference.

A further evolution in the use of a passive technique with a portable-device-based approach can be found in U.S. Pat. No. 7,155,159 co-invented and assigned to the present inventor. This patent discloses an encoded signal that is generated by a program signal source, such as a TV broadcast station. Its output signal, which is a combination of a programming signal and a surveying code, is received by code retransmission source that can be capable of suitably reproducing the programming signal for video and/or audio performance. However, for audience surveying purposes, its key function is to detect the surveying code in the signal received from programming signal source, and then to retransmit it in suitable fashion as the output signal. The code re-transmitted by the code retransmission source is detected and processed by stationary apparatus. A plurality of portable devices operate cooperatively with the stationary The reception location that the stationary apparatus would typically be placed within is in proximity to the reproduction equipment. For example, the stationary apparatus would be placed in an area containing a television for reproducing the video and/or audio programming signal in the broadcast signal. The area would also be of sufficient size to accommodate an audience, preferably of several members. An example would be a room with a television and seating capacity sufficient for several persons. The stationary apparatus is a self-contained, relatively small and unobtrusive unit that can be placed on a surface in the room in such a way that communication between it and the portable devices worn by persons in the room is not blocked. To some extent, the restrictions on its placement depend on the nature of the communication signals, with radio signals providing a higher degree of flexibility than infrared signals, for example. The installation of stationary apparatus is very simple in that it must be plugged into a wall outlet socket to receive power. Also, to enable data download, it is connected to a telephone line unless a cellular telephone device is used. Only a one time, fast, simple installation is involved that requires no retrofit of other apparatus in the house. This is in contrast to the prior art surveying equipment which does require a retrofitting operation. The stationary apparatus also improves the level of cooperation by the test participants because, for example, it overcomes any reluctance that prospective test participants would have to join the audience survey if it meant having holes drilled in their TV's, and the like.

The subject matter of U.S. Pat. No. 7,155,159 is hereby incorporated by reference.

If such a survey signal is available, then detecting it at the receiver (e.g. the TV) would indicate that the TV is also ON and that it is performing the program of interest. However, some broadcasters have been reluctant to allow their programs to be so encoded. Therefore, the broadcast output signal may not have such a survey signal combined with it. For such a situation, the present invention provides the following solution.

As shown in the drawing, a broadcast signal 1, such as a scrambled satellite signal for example, is received by a box 3. Box 3 generates a received output signal 15. For example, box 3 is a descrambling device that generates a descrambled broadcast signal in the conventional manner. Descrambled signal 15 would normally be inputted to TV 6 for display of the program. However, in accordance with an embodiment of the invention, descrambled signal 15 is inputted to encoder 10 which combines the descrambled signal 15 with a monitoring code 4 from code source 8 to produce encoded output signal 20. The monitoring code 4 added by encoder 10 can be a simple one, such as to provide only enough information to establish that TV 6 is ON. On the other hand, the monitoring code 4 can be more sophisticated so that it can itself provide viewership information, such as identifying the specific TV with which it is associated, the household it is in (so that its profile can be accessed), and/or the program into which it is encoded. Other advantageous applications of this code can readily be contemplated by a person with ordinary skill in this field. The particular code used from among those that can be stored in code source 8 is set by control signal 17 which can be provided in various well known ways either locally or remotely. The various codes that may be stored in code source 8 are either pre-stored therein or downloaded to it by well-known communication techniques, such as telephone or Internet.

The monitoring code 4 in encoded signal 20 is detected and processed by suitable circuitry (which can be part of TV 6, for example) and then re-transmitted as a signal 4 by TV 6 in a manner such as disclosed in the above-mentioned U.S. Pat. No. 7,155,159. The re-transmitted signal 4 is detected by stationary apparatus 5 which also performs other tasks such as processing, time stamping and storing the code. Stationary apparatus 5 periodically emits query signal 24 which triggers emission of an ID signal 24 by portable devices 7 carried by persons who are within a location of interest relative to TV 6. The positioning of such persons makes it possible for them to perceive a program being performed by the TV and they are, therefore, counted as being audience members. Information from signal 4 and ID signals 25 which is stored in stationary apparatus 5 is transmitted to central processing station 50 for further analysis. Full details on all of this are provided in U.S. Pat. No. 7,155,159.

The data from signals derived at central processing station 50 from stationary apparatus 5 can be used on its own to provide the viewership information, or such data can be used, by central processing station 50 for example, in combination with data from the above-mentioned signals from the box 3 that provide viewership information 2. Thus, for example, the viewership data 2 sent by box 3 can reveal the channel to which the box is tuned, while the data from the stationary apparatus 5 reveals that TV 6 was indeed performing the program then being broadcast on that channel, and it also identifies the audience member(s) present in the room at that particular time.

In operation, the descrambled output signal 15 of box 3 is encoded with monitoring code 4 by encoder 10. If stationary apparatus 5 registers the occurrence of the monitoring code 4 being received from TV 6, that information is indicative of the fact that the TV is ON and also that it must be displaying broadcast signal 1 into which the code was added. Thus, viewership information data 2 derived from box 3 and pertaining to TV 6 are considered reliable information when accompanied by the monitoring code 4 registered by stationary apparatus 5 as arriving from TV 6. In contrast, if box 3 is providing viewership information 2 while at the same time monitoring code 4 is not being detected by stationary apparatus 5 from TV 6, that viewership information is disregarded. The operation to disregard viewership information 2 can be effected in central processing station 50, for example. Such control operation can actually block the viewership information from being recorded, or the viewership information can be recorded, but it is tagged with an identifier to indicate that it occurred in the absence of a detected monitoring code. Since implementation of such an operation is readily attainable by a person with ordinary skill in the art, no further details are deemed necessary.

A variation of this invention is to put encoder 10 before box 3 so that broadcast signal 1 is encoded rather than the descrambled signal 15.

Although the drawing shows encoder 10 as a separate component, in fact it can be physically combined with another component, such as with stationary apparatus 5.

The above-described approach is effective to ensure that valid viewership information is counted to determine the size of an audience. Without this invention, inflated numbers might result when information provided by a box is taken into account even though the TV is not displaying the program of interest, either because the TV is OFF or because it is being used for another purpose, such as for videogames. This valuable result is obtained without the necessity to have the cable or satellite provider encode the program. Also, it is completely compatible with conventional cable/satellite boxes, and encoder 10 can be installed very easily and quickly. Moreover, the use of this approach takes advantage of the well developed technique disclosed in U.S. Pat. No. 7,155,159.

Although specific embodiments of the invention have been disclosed in detail above, various modifications thereto will readily occur to anyone with ordinary skill in the art. All such modifications are intended to fall within the scope of the present invention as defined by the following claims.

I claim:

1. An apparatus for monitoring viewership of programs being performed on reproduction equipment in response to a received broadcast signal from a cable or satellite provider, comprising:
    a receiving box which receives the broadcast signal to provide an output signal, the receiving box comprising a generating unit which generates viewership data for viewership information separate from the output signal, and a transmitting unit which transmits the generated viewership data;
    an encoding unit which adds a selected monitoring code to the output signal to provide a combined output signal to reproduction equipment for performing programs in the broadcast signal and for transmitting the monitoring code;
    a processing unit separate from the receiving box to process the viewership data transmitted by the transmitting unit; and
    a detecting unit, separate from the receiving box, the detecting unit being positioned in proximity to the reproduction equipment, to detect the transmitted monitoring code and transmit a signal related to the detected monitoring code to the processing unit independently of the receiving box;
    wherein the transmitting unit transmits the generated viewership data to the processing unit separately from the signal related to the detected monitoring code transmitted by the detecting unit to the processing unit, and
    the processing unit is configured to control the processing of the viewership data so that the viewership data is recorded only when the viewership data and the transmitted signal related to the detected monitoring code are received by the processing unit at the same time.

2. The apparatus of claim 1, wherein the broadcast signal is scrambled, and the receiver box is a descrambler.

3. The system of claim 1, wherein the reproduction equipment is a television.

4. A method for monitoring viewership of programs being performed on reproduction equipment in response to a received broadcast signal from a cable or satellite provider, comprising the steps of:
    receiving, by a receiver box, the broadcast signal to provide an output signal;
    generating, by the receiver box, viewership data for viewership information separate from the output signal;
    adding a selected monitoring code to the output signal to provide a combined output signal;
    inputting the combined output signal to reproduction equipment for performing programs in the broadcast signal and for transmitting the monitoring code;
    detecting the transmitted monitoring code by a code detector separate from the receiver box, the code detector positioned in proximity to the reproduction equipment;
    transmitting a signal related to the detected monitoring code to a processing device by the code detector independently of the receiver box, the processing device being separate from the receiving box;
    transmitting the generated viewership data to the processing device by the receiving box separately from the transmitted signal related to the detected monitoring code transmitted by the code detector; and
    processing the viewership data transmitted by the receiver box by the processing device by recording the viewership data only when the viewership data and the signal related to the detected monitoring code are received by the processing device at the same time.

5. An apparatus for monitoring viewership of programs being performed on reproduction equipment in response to a received broadcast signal from a cable or satellite provider, comprising:
    a receiver for receiving the broadcast signal, providing an output signal, generating viewership data for viewership information separate from the output signal, and transmitting the generated viewership data;
    an encoder for adding a selected monitoring code to the output signal to provide a combined output signal to reproduction equipment for performing programs in the broadcast signal and for transmitting the monitoring code;
    a signal processor to process the generated viewership data transmitted by the receiving box; and
    a detector separate from the receiver, the detector being positioned in proximity to the reproduction equipment for detecting the transmitted monitoring code and for transmitting a signal related to the monitoring code to the signal processor separately from the viewership data transmitted by the receiver, and independently of the receiver,
    wherein the signal processor is configured to process the viewership data by recording the transmitted viewership data and identifying, with an identifier, the recorded viewership data whenever the viewership data and the signal related to the monitoring code are not received by the signal processor at the same time, and
    the signal processor is configured to record the transmitted viewership data without the identifier only when the viewership data and the signal related to the monitoring code are received at the same time.

6. The apparatus of claim 5, wherein the broadcast signal is scrambled, and the receiver box is a descrambler.

7. The apparatus of claim 1, wherein the detecting unit is separate from the receiving box.

8. The apparatus of claim 1, wherein the set top box is configured to generate viewership data based, at least in part, on a channel that the receiver box is tuned to.

9. The method of claim 4, comprising detecting the transmitted monitoring code by a code detector separate from the receiving box.

10. The method of claim 4, comprising generating the viewership data based, at least in part, on a channel to which the receiver box is tuned.

11. A method for monitoring viewership of programs being performed on reproduction equipment in response to a received broadcast signal from a cable or satellite provider, comprising the steps of:
    receiving, by a receiver, the broadcast signal to provide an output signal;
    generating, by the receiver, viewership data for viewership information separate from the output signal;
    adding a selected monitoring code to the output signal to provide a combined output signal;

inputting the combined output signal to reproduction equipment for performing programs in the broadcast signal and for transmitting the monitoring code;

detecting the transmitted monitoring code by a code detector separate from the receiver, the code detector being positioned in proximity to the reproduction equipment; and transmitting a signal related to the detected monitoring code to a processing device by a-code detector independently of the receiver;

transmitting the generated viewership data to the processing device by the receiving box separately from the signal related to the detected monitoring code transmitted by the code detector; and processing the viewership data transmitted by the receiver box by the processing device by recording the transmitted viewership data and identifying, with an identifier, the recorded viewership data received when viewership data and the signal related to the monitoring code are not received, by the processing device, at the same time; and processing the viewership data transmitted by the receiver box by the processing device by recording the viewership data without the identifier only when the viewership data and the signal related to the monitoring code are received at the same time.

12. The method of claim 11, wherein processing the viewership data further comprises processing the viewership data based, at least in part, on whether the viewership data is identified by an identifier.

13. The apparatus of claim 11, wherein processing the viewership data further comprises processing the viewership data based, at least in part, on whether the viewership data is identified by an identifier.

14. The method of claim 11, comprising:
adding the selected monitoring code by an encoder.

15. The method of claim 4, comprising:
adding the selected monitoring code by an encoder.

16. The apparatus of claim 1, wherein the signal related to the detected monitoring code comprises the monitoring code.

17. The method of claim 4, wherein the signal related to the detected monitoring code comprises the detected monitoring code.

18. The apparatus of claim 1, wherein the signal related to the monitoring code is transmitted by the transmitting unit directly to the processing unit.

* * * * *